United States Patent [19]

Davey et al.

[11] Patent Number: 4,772,306
[45] Date of Patent: Sep. 20, 1988

[54] MOLTEN GLASS GOB DELIVERY SYSTEM

[75] Inventors: Richard G. Davey; Donald E. Schupbach, both of Toledo, Ohio

[73] Assignee: Owens-Illinois Glass Container Inc., Toledo, Ohio

[21] Appl. No.: 107,741

[22] Filed: Oct. 13, 1987

[51] Int. Cl.$^4$ ............................................. C03B 7/16
[52] U.S. Cl. ...................... 65/325; 65/225; 65/303; 65/304
[58] Field of Search ............... 65/222, 225, 303, 304, 65/325

[56] References Cited

U.S. PATENT DOCUMENTS

| Re. 28,759 | 3/1988 | Bystrianyk et al. | 65/225 X |
| 1,843,159 | 2/1932 | Ingle | 65/225 X |
| 2,859,559 | 11/1958 | Mumford | 65/304 |
| 3,597,187 | 8/1971 | Trudeau | 65/225 X |
| 4,002,453 | 1/1977 | Becker | 65/304 X |
| 4,339,263 | 7/1982 | Martin | 65/303 X |

Primary Examiner—Arthur Kellogg

[57] ABSTRACT

A gob delivery system for molten glass charges or gobs from a multiple orifice feeder to a plurality of parison molds in which the transmit times of the gobs are held to a minimum. The gob scoops, which initially deflect the gobs into straight troughs, are formed with a spiral curve to impart less of a curve to the charge. The deflectors which receive the gobs or charges from the troughs are also formed as spiral curves so that the gobs will be presented to vertical guide tubes with a minimum of angular distortion to give more consistent loading.

3 Claims, 4 Drawing Sheets

MOLTEN GLASS GOB DELIVERY SYSTEM

BACKGROUND OF THE INVENTION

In the delivery of plural gobs of molten glass, simultaneously, to one of a plurality of stationary glass molding machine sections positioned beneath the gob former, it has been a constant goal that the plural gobs arrive at the mold of a section at the same, precise time so that the gobs will all undergo the same degree of cooling while being transformed into a parison. This goal is an obviously difficult one to attain because the gobs may be traveling slightly different distances and manufacturing differences between delivery system geometry. When considering the problem of obtaining consistent and predictable loading characteristics between as many as 10 or 12 sections which will each receive the plurality of gobs at timed intervals from a feeder that is cutting gobs at a preset rate, it can be seen that there are tremendous timing problems involved.

In order to avoid inconsistent loading of gobs, various systems have evolved, but most have resulted in what would best be termed compromises between the practical and the expensive systems.

Studies of gob delivery systems in operation with high speed cameras reveal many unforeseen situations that can effect the actual time of travel of an individual gob from the point of severance from the stream at the feeder to the actual passage of the gob into the upper end of the parison mold cavity.

The fact remains that gob delivery to each cavity on a machine is very inconsistent and that the inconsistency is random in nature. A given cavity may be satisfactory, and then for no explainable reason, it becomes bad. One factor that will contribute to an inconsistent delivery is poor maintenance of the equipment. The proper alignment of the presently used equipment has been difficult to achieve and maintain. With the present design of equipment, requirements in the future, when trying to lightweight the gobs and bottles, cannot be met.

With the foregoing in view, it is an object of this invention to provide a basically new design of a gob delivery system which will provide more consistent loading of the gobs.

It is a further object of this invention to provide a new delivery system which employs transition spirals in the curved segments so that there will be a gradual transition from linear to circular motion or from circular motion to linear motion.

Other objects will be apparent from this following description taken in conjunction with the annexed sheets of drawings.

DETAILED DESCRIPTION OF THE DRAWINGS

Figure 1:
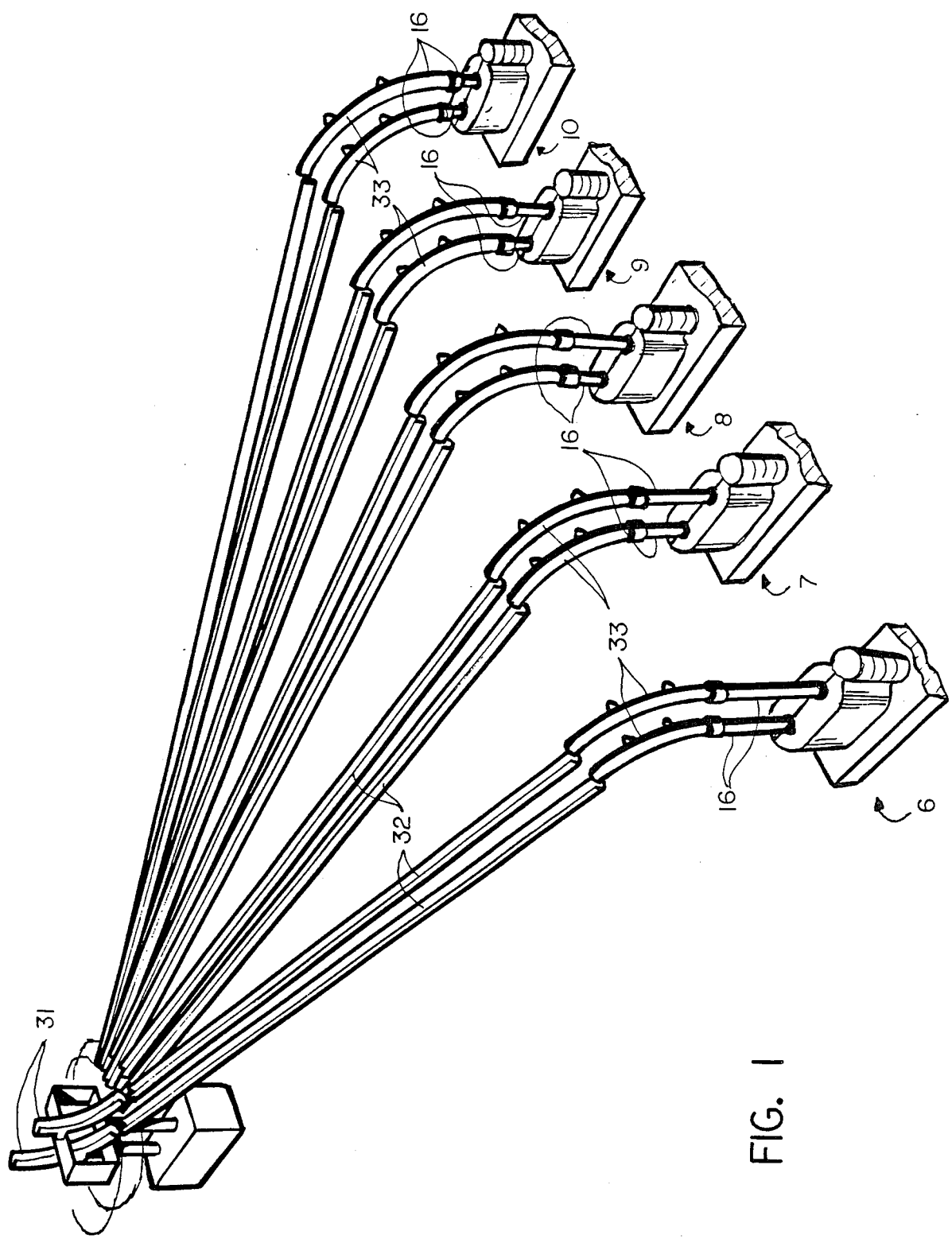
FIG. 1 is a schematic perspective view illustrating the gob distributing system of the invention applied to the right-hand five sections of a 10-section I.S. (Individual Section) glass forming machine.
Figure 2:
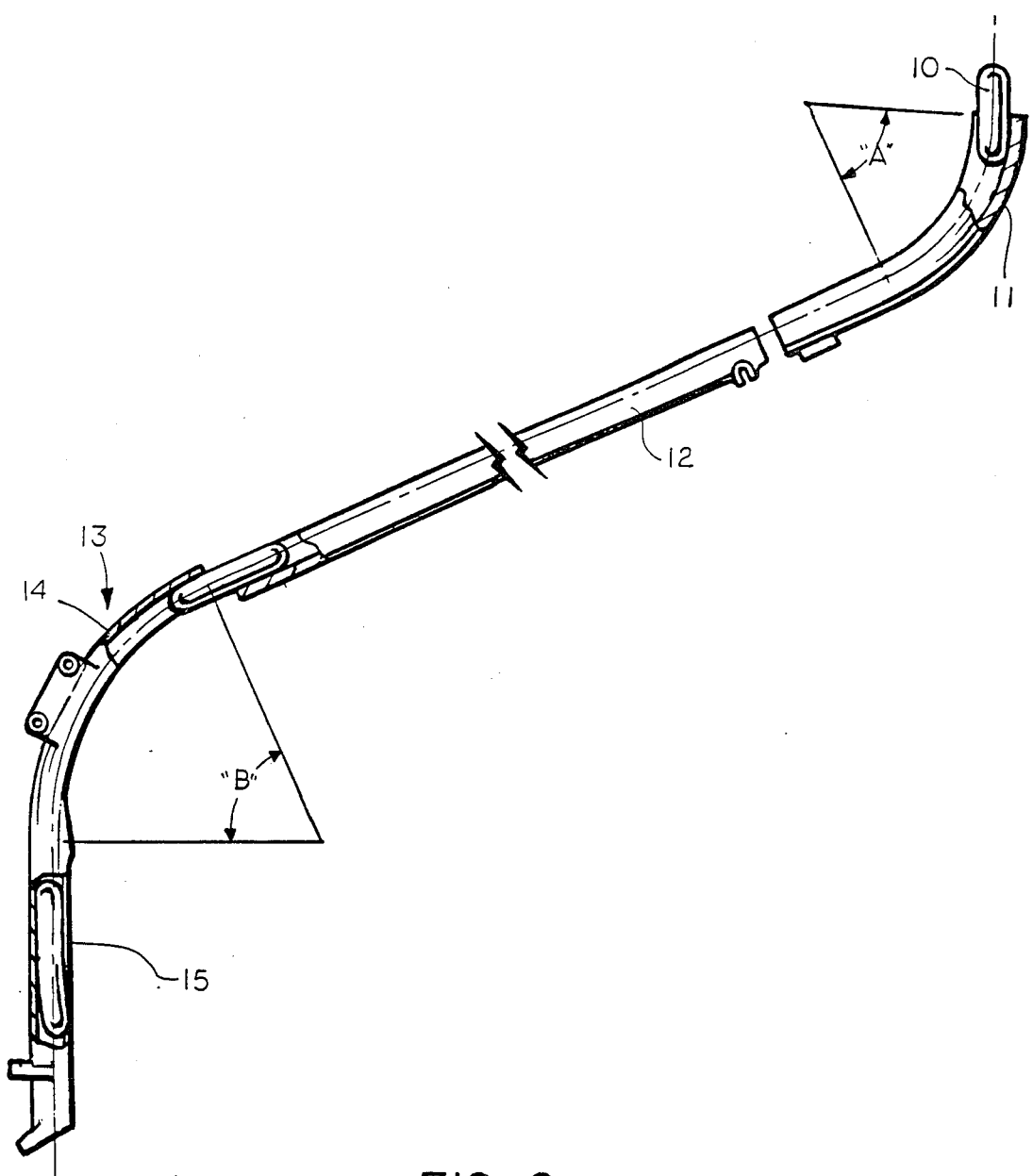
FIG. 2 is a side elevational view of the prior art delivery system for section No. 8 of a 10-section machine.

With particular reference to the drawings and in particular to FIG. 2, there is shown the "prior art" delivery system when the cut gobs 10 of molten glass are dropped into the upper end of an oscillatory gob scoop 11. The scoop 11, only a single one is illustrated, it being understood that in modern day I.S. machines there are usually at least three gobs simultaneously cut and dropped into a set of three scoops. In fact, it is now common practice to feed four gobs at a time to an I.S. machine that will have up to ten quadruple-cavity parison molds set in line beneath the feeder. The orifices in the feeder, of course, are stationary with the upper ends of the set of scoops normally in vertical alignment with the vertical axis of the orifices. Each of the scoops of a set, whether two as shown in FIG. 1, or more, will be mounted for oscillation about their receiving ends so that their delivery ends will be brought into coplanar, vertical alignment with the entry end of a straight trough 12 into which the gobs will be delivered. The trough 12 is straight and inclined downward with respect to the horizontal so that a hot gob that is passed thereto from the scoop will travel down its length by gravity. As the molten glass gob engages the scoop, it will be deflected by the curvature of the scoop and there is a tendency for the gob to slightly elongate and, because of the centrifugal force exerted on the gob by the curve, it will assume a slight curl; but when the gob is delivered to the straight trough, the gob will straighten out and become somewhat further elongated by its gravitation contact with the trough. The straight gob will then leave the end of the trough 12 and enter the deflector 13. The deflector 13 is open at its bottom but has a curved upper surface 14 that is engaged by the gob when it leaves the end of the trough. The upper portion of the deflector is generally an inverted U-shaped, in cross-section, member. The gob will enter the deflector on essentially a tangent with little impact of the gob with the deflector. After the gob engages the inner-upper surface 14 of the deflector 13 it will be guided by the curved surface into a vertical section 15 of the deflector. The vertical section 15 is joined at its bottom end to the upper end of a vertical guide tube. As the gob passes through the deflector, it is subjected to centrifugal force as it follows the curvature of the deflector and after entering the lower straight portion it may still have a slight curvature due to this centrifugal force, as illustrated in FIG. 2. Once the gob enters the delivery tube, it will be guided in a straight vertical path and the gob will tend to be straightened out.

With respect to the showing in FIGS. 1 and 3-6 of the gob delivery system of the invention, a pair of scoops 31 are shown mounted so that their delivery ends will sweep in alignment with the receiving ends of sets of straight troughs 32. Each of the troughs 32 is in fixed alignment with the receiving ends of deflectors 33. Each of the individual deflectors 33 of each set are of the same curvature and length with their lower, vertical ends being joined to the upper end of a vertical guide or delivery tube 16. It should be noted that the guide tubes 16, which extend from the lower ends of the deflectors to the position in alignment with the mold cavities at the sections numbered 6-10, are of different lengths. The scoops 31 are closer to the section 6 than sections 7, 8, 9 or 10 in the normal arrangement of the gob feeder in relation to the 10 sections of the I.S. machine. The molds which receive the gobs are in alignment, side-by-side in a straight line while the scoop oscillates in a predetermined pattern in order to feed the gobs to the sections.

The actual cross-section configuration of the delivery tube may be selected from the two embodiments of FIGS. 3 and 4 and FIGS. 5 and 6. In the FIGS. 3 and 4 embodiment the tube 16 has a cross-section such as that shown in FIG. 4 and the gob will engage the curved inner surface 17 which is of generally the same curvature as the gob. The two straight or flat portions 18 and 19 will only touch small areas of the gob to aid in centering and guiding the gob in its vertical fall into the parison mold cavity. The two surfaces 18 and 19 form a gap 20 therebetween which extends the full height of the tube and lets any air which might be trapped in the tube escape ahead of the gob and thus not impede its movement therethrough.

Figure 6:
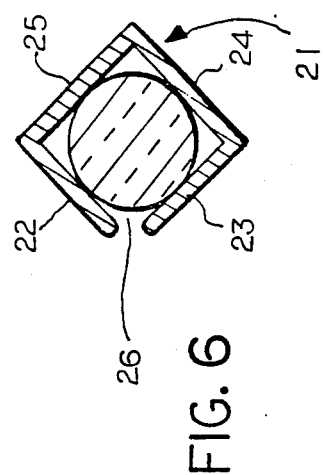
FIG. 6 is a cross-sectional view taken at 6—6 of FIG. 5.
Figure 5:
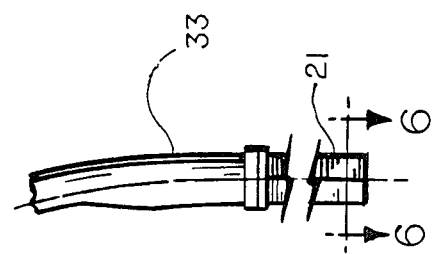
FIG. 5 is a side elevational view of the delivery end of an alternative straight section of the deflector.

The second embodiment of a delivery tube 21 is shown in FIGS. 5 and 6. With particular reference to FIG. 6, it can be seen that the tube is formed of four sides 22, 23, 24 and 25 with the angles between sides 22, 25; 24, 25 and 24, 23 all being 90°. At what would be the fourth corner of the square defined by the sides, it can be seen that sides 22 and 23 are shorter than the other sides and thus form a gap 26 therebetween which serves as an air vent slot extending the full height of the tube. The gob will be centered in the tube 21 and be in contact with the inner sides of the tube. Since there is not a whole lot of gob contact area with the inside of the tube during free fall therethrough, the gob's progress will not be impeded as it is delivered to the upper end of a parison mold.

Figure 3:
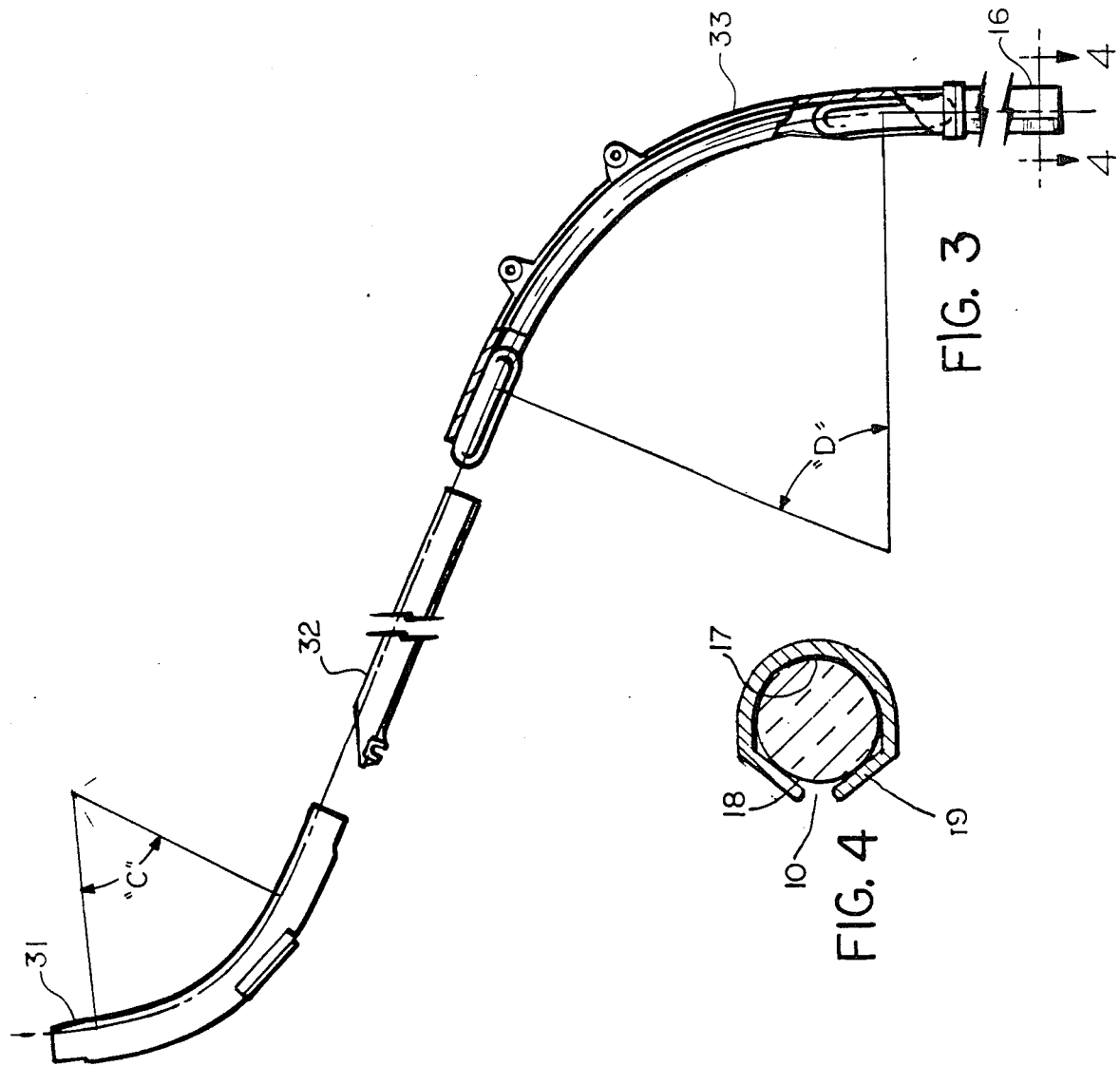
FIG. 3 is a side elevational view of the present invention for delivering gobs to section No. 8 of a 10-section machine.
Figure 4:
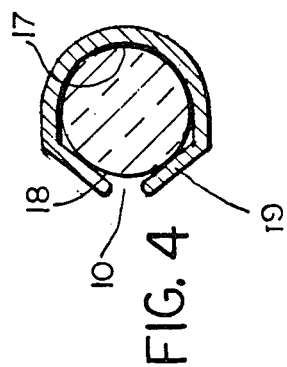
FIG. 4 is a sectional view taken at 4—4 of FIG. 3.

While the foregoing description is generally applicable to the delivery of gobs by the prior art systems shown in FIG. 2, with the exception of the configuration of the vertical drop tube at the lower end of the deflector 15, the prior art differs from the system of the invention in that the angles of curvature "A" and "B" of the scoop and deflector, respectively, are of a significantly shorter radius than those of the invention illustrated in FIG. 3. Thus the distance over which the gob is in contact with the scoop and deflector is greater, with the curves being more gradual so that the gobs do not experience the bending due to the centrifugal force to the same degree as in the prior art.

The curves "C" and "D" are specifically chosen as transition spirals. The specific curve is a clothoid spiral in which the curvature at a point is proportional to the arc length measured from the start of the curve to the point. A spiral is used for a gradual transition from linear to circular motion or from circular to linear motion. Comparison of FIGS. 2 and 3 clearly show that the conditions are superior at the scoop and deflector entrances since the approach of the gob is nearly tangent to the curve. At the scoop and deflector exits, the spiral retains control of the gob over a longer path and tends to reduce its curvature from centrifugal force. The spiral curves chosen are actually configured so that the gobs are given a direction change that is the result of an initial curve that has a first radius. The central section of the curve has a shorter radius with the exit section being formed as a curve with increasing radii. Thus the gobs are subjected to direction changes that are not the result of a constant radius curvature in the gob distributor or the deflector. Further, the curvature of both the distributor and deflectors is such that the gobs enter a relatively less curved section, then move through a curve of less radius and then exit through a curve that is of increasing radius as the result of choosing the transition spiral curve.

Figure 7:
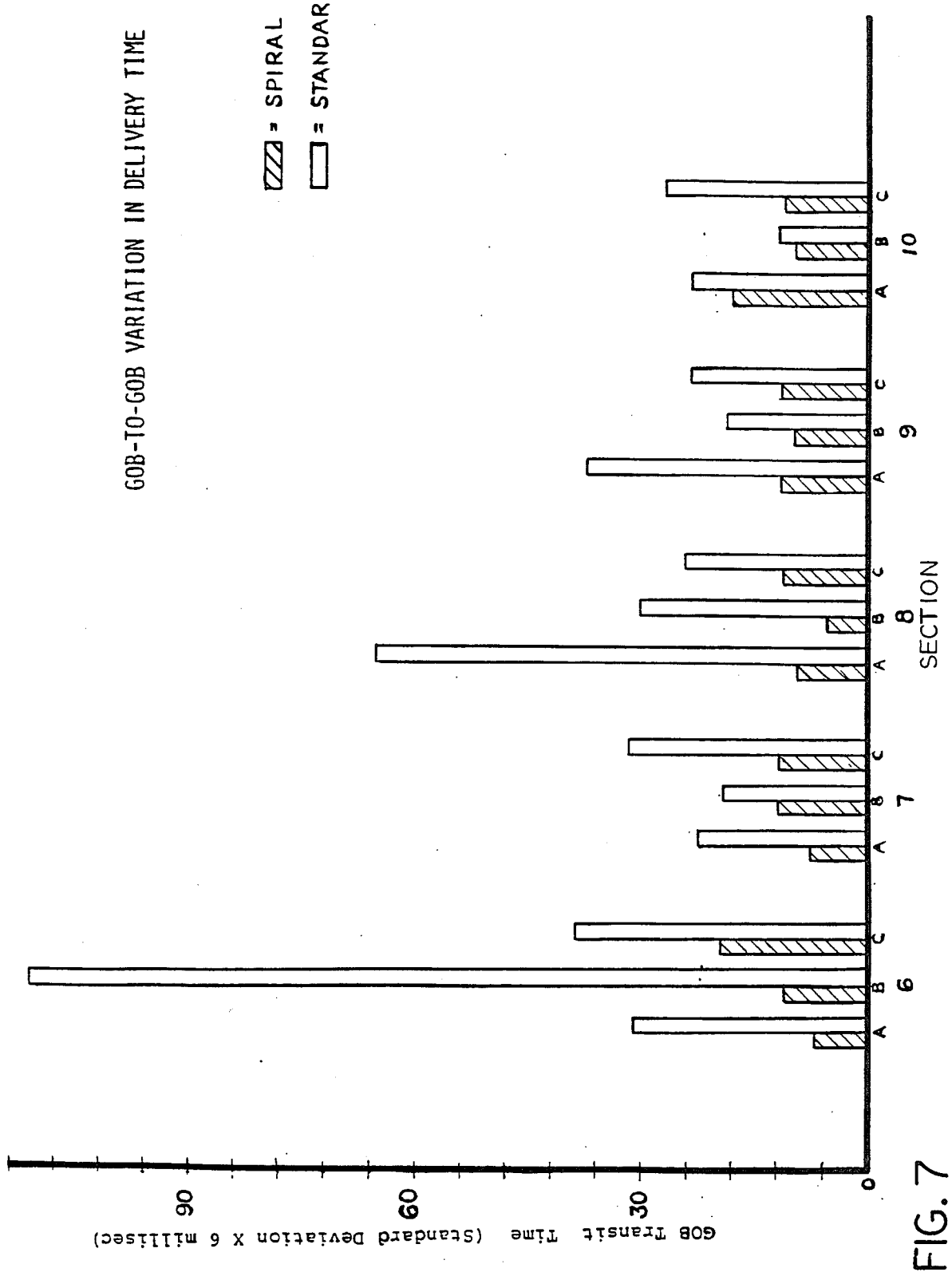
FIG. 7 is a bar-graph illustrating comparative standard deviations for gob delivery times.

The bar-graph of FIG. 7 is of actual standard deviations in gob delivery times of the number 6-10 sections of a triple gob, 10-section machine and illustrates the obvious improvement of delivery time variations when using the spiral curves versus the standard curves.

The variations in time on the FIG. 7 bar-graph are those caused by the delivery equipment. As one can see when viewing the graph, the center gob of the three delivered to section No. 6 by the "standard" equipment is the slowest moving of those measured.

In every instance, the spiral delivery equipment resulted in a much more consistent delivery time of the sets of gobs to each of the machines. When considering that the set of three gobs is sheared simultaneously by the shear mechanism of the feeder, the transit time of the gobs would ideally be the same for each section so that the gobs would all be subject to the same cooling on their way to the molds. Also, before the mechanism of the molds can be operated, the baffle and settle blow heads must be seated, since the "settle blow" of the gobs in the parison mold can only be effected after movement of the settle blow head over the mold opening. This obviously must await the delivery of all the gobs to a particular section. If the head is moved too early, it could interfere with gob loading. The time cycle of the section operation must be slowed in order to accommodate the slowest gob transit time.

The new gob delivery system of the invention using spiral curves provides apparatus where the gobs enter the scoops and deflectors at a tangent to the curve. The gobs are controlled for as long as possible in their travel and the cost of the deflectors is reduced. All of the sets of deflectors 33 are the same, whether on the first, second, sixth or any of the ten sections. The only element of the equipment that is different is the length of the straight troughs 32 and the vertical height of the straight, drop tubes 16 which guide the gobs from the exit of the deflectors to the open, upper end of the parison mold.

The foregoing description is one which will enable one skilled in the art to which the invention is directed to be able to practice the invention. However, it is understood that the specific details may be changed without departing from the scope and spirit of the invention as set forth in the claims.

What is claimed:

1. An improved gob delivery system for guiding mold charges in gravitational fall from a feeder orifice to a parison mold; wherein a curved scoop having its upper end in vertical alignment beneath the feeder orifice and its lower end movable through an arc into alignment with a plurality of straight stationary troughs, and a plurality of curved deflectors having their receiving or entrance ends in alignment with the exit ends of the troughs and their exit ends forming a straight section in vertical alignment with the mold cavities, the improvement comprising, said curved scoop being formed using transition spirals to assure gradual transition from circular to linear and linear to circular motion, said curved scoop having a curvature at a point which is proportional to the arc length measured from the start of the curve to the point.

2. The improved gob delivery system of claim 1 further including said curved deflectors being formed using transition spirals, said curved deflectors having a curvature at a point which is proportional to the "arc length" measured from the start of the curve to the point.

3. The improved gob delivery system of claim 1 or 2 wherein said curves for the scoop and deflectors are clothoid spirals.

* * * * *